US010919356B2

(12) United States Patent
Ekström

(10) Patent No.: US 10,919,356 B2
(45) Date of Patent: Feb. 16, 2021

(54) SPHERICAL SUPPORT FOR A SPRING SEAT IN A VEHICLE SUSPENSION SYSTEM

(71) Applicant: Volvo Car Corporation, Gothenburg (SE)

(72) Inventor: Kenneth Ingemar Ekström, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 89 days.

(21) Appl. No.: 16/234,689

(22) Filed: Dec. 28, 2018

(65) Prior Publication Data
US 2020/0207173 A1 Jul. 2, 2020

(51) Int. Cl.
*B60G 15/06* (2006.01)
*F16F 13/00* (2006.01)
*B60G 3/06* (2006.01)

(52) U.S. Cl.
CPC ............ *B60G 15/063* (2013.01); *B60G 3/06* (2013.01); *F16F 13/007* (2013.01); *B60G 2200/142* (2013.01); *B60G 2202/312* (2013.01); *B60G 2204/1242* (2013.01); *B60G 2206/73* (2013.01); *B60G 2206/821* (2013.01); *B60G 2800/162* (2013.01); *F16F 2224/025* (2013.01); *F16F 2226/042* (2013.01); *F16F 2230/0005* (2013.01)

(58) Field of Classification Search
CPC .. B60G 15/063; B60G 3/06; B60G 2206/821; B60G 2800/162; B60G 2206/73; B60G 2200/142; B60G 2204/1242; B60G 2202/312; F16F 13/007; F16F 2226/042; F16F 2224/025; F16F 2230/0005
See application file for complete search history.

(56) References Cited

U.S. PATENT DOCUMENTS 2,537,629 A * 1/1951 Brown ................ F16C 11/0652
  403/132
2,664,047 A * 12/1953 Huber ..................... F04B 49/24
  417/304
2,980,441 A * 4/1961 Timpner ................ B60G 15/12
  280/124.141

(Continued)

FOREIGN PATENT DOCUMENTS

CN        204998295 U       1/2016
DE        10254632 A1       6/2004
(Continued)

*Primary Examiner* — Timothy Wilhelm
(74) *Attorney, Agent, or Firm* — Clements Bernard Walker; Christopher L. Bernard

(57) ABSTRACT

A spring-damper assembly includes a damper, a coil spring disposed axially about the damper and directly or indirectly engaging an upper spring seat and a lower spring seat. A spherical support is disposed about and coupled to the damper or strut and is in contact with the upper spring seat or the lower spring seat, respectively. The spherical support allows relative movement between the spherical support and the associated upper or lower spring seat to provide a self-aligning feature for minimizing side forces exerted by the coil spring on the damper or strut. In one exemplary embodiment, a layer of material is disposed between the spherical support and the associated upper or lower spring seat to facilitate relative movement between the spherical support and the associated upper or lower spring seat.

20 Claims, 3 Drawing Sheets

(56) References Cited

U.S. PATENT DOCUMENTS

| | | | | |
|---|---|---|---|---|
| 3,099,879 A * | 8/1963 | Horovitz | ............... | F16D 3/70 29/436 |
| 3,703,184 A * | 11/1972 | Messerschmidt | ...... | F02M 61/12 137/509 |
| 4,722,631 A * | 2/1988 | Tagami | ............... | F16C 11/0633 403/133 |
| 4,779,855 A * | 10/1988 | Tanaka | ................ | B60G 15/068 267/220 |
| 5,338,055 A * | 8/1994 | Mauz | ................ | B60G 13/008 267/280 |
| 6,382,645 B1 * | 5/2002 | Gravelle | ............ | B60G 15/068 280/124.147 |
| 6,854,722 B2 * | 2/2005 | Causemann | ......... | B60G 15/063 267/221 |
| 6,988,718 B1 * | 1/2006 | Eulenbach | ........... | B60G 15/063 188/321.11 |
| 7,000,909 B2 * | 2/2006 | Kellam | ................ | B60G 15/063 267/221 |
| 7,448,478 B2 * | 11/2008 | Thomas | ............... | B60G 15/067 188/321.11 |
| 8,302,980 B2 | 11/2012 | Scolaro et al. | | |
| 8,376,329 B2 * | 2/2013 | Michel | .................. | B60G 7/005 267/140.5 |
| 8,602,430 B2 * | 12/2013 | Subbarayalu | ............ | B60G 9/00 267/241 |
| 9,027,946 B2 * | 5/2015 | Suzuki | ...................... | F16F 1/12 280/124.179 |
| 9,085,214 B2 * | 7/2015 | Nachbar | ................ | B60G 11/50 |
| 9,726,250 B1 * | 8/2017 | Lee | ........................... | F16F 9/54 |
| 10,549,592 B2 * | 2/2020 | Meyer | ................ | F16C 11/0657 |

FOREIGN PATENT DOCUMENTS

| | | |
|---|---|---|
| DE | 10358521 A1 | 7/2005 |
| DE | 102011018751 A1 | 10/2012 |

* cited by examiner

SPHERICAL SUPPORT FOR A SPRING SEAT IN A VEHICLE SUSPENSION SYSTEM

TECHNICAL FIELD

The present invention relates generally to the automotive field. More specifically, the present invention relates to suspension components for a vehicle, and especially spring-damper components utilizing a spherical support for a spring seat.

BACKGROUND ART

In a vehicle, a conventional double wishbone suspension 100, such as that illustrated in FIG. 1, is an independent suspension design using two (occasionally parallel) wishbone-shaped arms 106,108 to locate the wheel (not illustrated). Each wishbone or arm 106,108 has two mounting points to the chassis (not illustrated) and one joint at a knuckle 102. A damper or shock absorber 112 and coil spring 110 mount to the wishbones 106,108 to control vertical movement of the vehicle.

The double-wishbone suspension 100 can also be referred to as "double A-arms," although the arms 106,108 themselves can be A-shaped, L-shaped, or even be single bar linkages. A single wishbone or A-arm 106 can also be used in various other suspension types, such as variations of the MacPherson strut. For example, in other suspension types, the upper arm 108 is usually shorter to induce negative camber as the suspension 100 jounces (i.e., rises), and often this arrangement is titled an "SLA" or "short long arms" suspension.

A SLA suspension is also known as an unequal length double wishbone suspension. The upper arm 108 is typically an A-arm, and is shorter than the lower arm 106, which is typically an A-arm or an L-arm, or sometimes a pair of tension/compression arms. In the latter case, the suspension can be called a multi-link, or dual-ball joint suspension.

The four-bar linkage mechanism formed by the unequal arm lengths causes a change in the camber of the vehicle as it rolls, which helps to keep the contact patch square on the ground, increasing the ultimate cornering capacity of the vehicle. It also reduces the wear of the outer edge of the tires.

Between the outboard ends of the arms 106,108 is the knuckle 102. The knuckle 102 includes a kingpin for horizontal radial movement in older designs, and rubber or trunion bushings for vertical hinged movement. In newer designs, a ball joint at each end allows for all movement. Attached to the knuckle 102 at its center is a bearing hub, or in many older designs, a spindle to which the wheel bearings are mounted.

To resist fore-aft loads, such as acceleration and braking, the arms 106,108 require two bushings or ball joints at the chassis, for example.

At the knuckle end, single ball joints are typically used, in which case the steering loads have to be taken via a steering arm, and the wishbones 106,108 look A or L-shaped. An L-shaped arm is generally preferred on passenger vehicles because it allows a better compromise of handling and comfort to be tuned in. The bushing in-line with the wheel can be kept relatively stiff to effectively handle cornering loads, while the off-line joint can be softer to allow the wheel to recess under fore-aft impact loads. For a rear suspension, a pair of joints can be used at both ends of the arms 106,108, making them more H-shaped in plan view. In elevation view, the suspension 100 is a 4-bar link, and it is easy to work out the camber gain and other parameters for a given set of bushing or ball joint locations. The various bushings or ball joints do not have to be on horizontal axes, parallel to the vehicle center line. If they are set at an angle, then anti-dive and anti-squat geometries can be selectively adjusted.

Although double wishbone and like suspension designs allow an engineer to carefully control the motion of a wheel throughout suspension travel, controlling such parameters as camber angle, caster angle, toe pattern, roll center height, scrub radius, scuff, and more, these designs have some disadvantages in the quality of ride and the handling of the vehicle. In particular, side forces from the coil springs 110 applied to the dampers or shock absorbers 112 may deteriorate ride comfort and cause damper or shock absorber wear. These coil spring side forces effectively lead to damper binding that must be overcome, causing ride discomfort due to eventual binding release.

SUMMARY

The problem of ride comfort deterioration and excessive damper wear from side forces exerted by the coil springs on the dampers in a suspension system, such as a double wishbone suspension system or the like, is solved by providing a spherical support engaging one or both of the lower and upper spring seats that hold the coil spring around the damper. Each spherical support is concentrically coupled to the spring seat housing and provides a self-alignment feature for the coil spring with respect to the damper when the coil spring side forces act on the damper that runs through the coil spring. The elimination of such coil spring side forces effectively minimizes damper binding that must be overcome, minimizing ride discomfort due to eventual binding release.

In one aspect, a spring-damper assembly for use in a suspension system of a vehicle includes: a damper, a coil spring disposed axially about the damper and extending between a lower spring seat and an upper spring seat, and one or more spherical supports disposed about and coupled to the damper and movably engaging one or more of the lower spring seat and the upper spring seat, the one or more spherical supports minimizing side forces exerted by the coil spring on the damper by allowing relative movement between the coil spring and the damper perpendicular to an axis of the spring-damper assembly.

In another aspect, a damper assembly for use in a suspension system of a vehicle includes: a housing including a lower portion and an upper portion, wherein the lower portion and the upper portion of the housing are axially translatable with respect to one another, and one or more spherical supports disposed about and coupled to one or more of the lower portion and the upper portion, respectively, of the housing and adapted to movably engage one or more of a lower spring seat and an upper spring seat, respectively, coupled to either end of a coil spring disposed therebetween, wherein the one or more spherical supports are adapted to minimize side forces exerted by the coil spring on the housing by allowing relative movement between the coil spring and the housing perpendicular to an axis of the damper assembly.

In a further aspect, a vehicle suspension system includes: a control arm, and a spring-damper assembly coupled to the control arm and adapted to be coupled to a structure of a vehicle, the spring-damper assembly including a damper, a coil spring disposed axially about the damper and extending between a lower spring seat and an upper spring seat, and one or more spherical supports disposed about and coupled to the damper and movably engaging one or more of the lower spring seat and the upper spring seat, the one or more spherical supports minimizing side forces exerted by the coil spring on the damper by allowing relative movement between the coil spring and the damper perpendicular to an axis of the spring-damper assembly.

BRIEF DESCRIPTION OF THE DRAWINGS

While various exemplary embodiments of the present invention are illustrated and described herein, the particular embodiments provided should not be construed to be limiting. It is anticipated that various changes and modifications may be made without departing from the scope of the invention, in which.

DESCRIPTION OF EMBODIMENTS

Again, the problem of ride comfort deterioration and excessive damper wear from side forces exerted by the coil springs on the dampers in a suspension system, such as a double wishbone suspension system or the like, is solved by providing a spherical support engaging one or both of the lower and upper spring seats, providing a self-alignment feature for the coil spring with respect to the damper when coil spring side forces act on the damper that runs through the coil spring.

The spring-damper assembly provided herein generally includes a damper (or, interchangeably, a strut or shock absorber), a coil spring disposed about the damper and extending between an upper spring seat and a lower spring seat, and one or more spherical supports disposed about the damper (and, specifically, the damper housing) and engaging one or more of the lower spring seat and the upper spring seat. This configuration allows the coil spring to find a natural position about the damper at all times, with the spherical support(s) providing a self-aligning feature that thereby minimizes side forces exerted by the coil spring on the damper.

Figure 1:
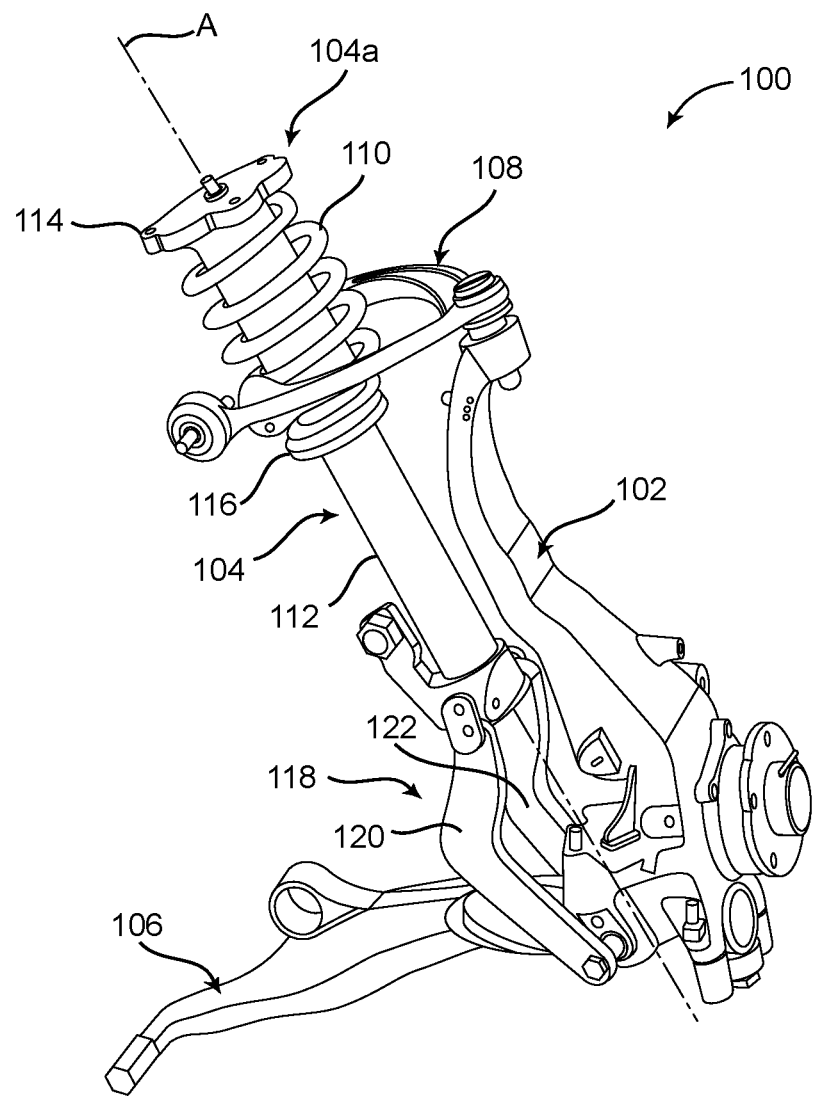
FIG. 1 in an isometric view of a conventional vehicle suspension, for example, a double wishbone suspension for a left-front side of a vehicle.

Referring again to FIG. 1, to provide additional context in which the spring-damper assembly provided herein is used, a conventional vehicle suspension assembly 100, such as a double wishbone suspension or the like, is shown, the main components of which are well known to those of ordinary skill in the art. For this reason, the general design is described only briefly herein.

The double wishbone suspension 100 includes a knuckle 102 for rotatably supporting a wheel (not illustrated) and a spring-damper assembly 104, such as a conventional spring-damper assembly or the spring-damper assembly provided herein, laterally spaced inwardly from the knuckle 102. The suspension assembly 100 further includes a lower control arm 106 and an upper control arm 108 connecting the knuckle 102 to the spring-damper assembly 104. The spring-damper assembly 104 extends substantially vertically, while the arms 106, 108 extend substantially horizontally. Thus, the spring-damper assembly 104 controls vertical movement of the arms 106, 108 which are held in parallel by the knuckle 102.

As is known and understood by those of ordinary skill in the art, the spring-damper assembly 104 is of the type having a coil spring 110 coaxially surrounding a damper 112, about a central, longitudinal axis, A, thereof. The spring-damper assembly 104 includes an upper spring seat 114 that can be mounted to a part of a vehicle body (not illustrated), such as a frame or wheel well structure or the like. The spring-damper assembly 104 also includes a lower spring seat 116. The upper and lower spring seats 114, 116 are in direct contact with and retain the coil spring 110, which is retained between the upper and lower spring seats 114, 116. Conventionally, the upper and lower spring seats 114, 116 are rigidly coupled to the housing of the damper 112, which has upper and lower portions that are allowed to translate axially with respect to one another. Thus, the upper and lower spring seats 114, 116 are held in rigid alignment, aside from this axial translation, and the coil spring 110 is held in rigid alignment with the housing of the damper 112, leading to the problem addressed by the spring-damper assembly 104 provided herein.

The suspension assembly 100 also includes a fork 118 with legs 120, 122 coupled to the spring-damper assembly 104. The legs 120, 122 are spaced apart such that they are capable of accommodating a driveshaft (not illustrated) therebetween. The lower control arm 106 is directly connected to the spring-damper assembly 104 and one end of the knuckle 102. The lower control arm 106 is also connected to a part of the vehicle body, such as a side frame member or subframe (not illustrated). The upper control arm 108 is directly connected to the spring-damper assembly 104 at another, opposite end of the knuckle 102. It will be readily apparent to those of ordinary skill in the art that the spring-damper assembly 104 provided herein can be used with numerous types of suspension systems, provided a coil-over-damper component configuration is required, which often undesirably results in the coil spring 110 exerting side forces on the damper 112. This can cause damper or strut binding, the release of which can cause ride discomfort. In general, the spring-damper assembly 104 provided herein can be used in any application that uses such a coil-over-spring component configuration, not limited to the vehicle suspensions discussed herein.

Figure 2:
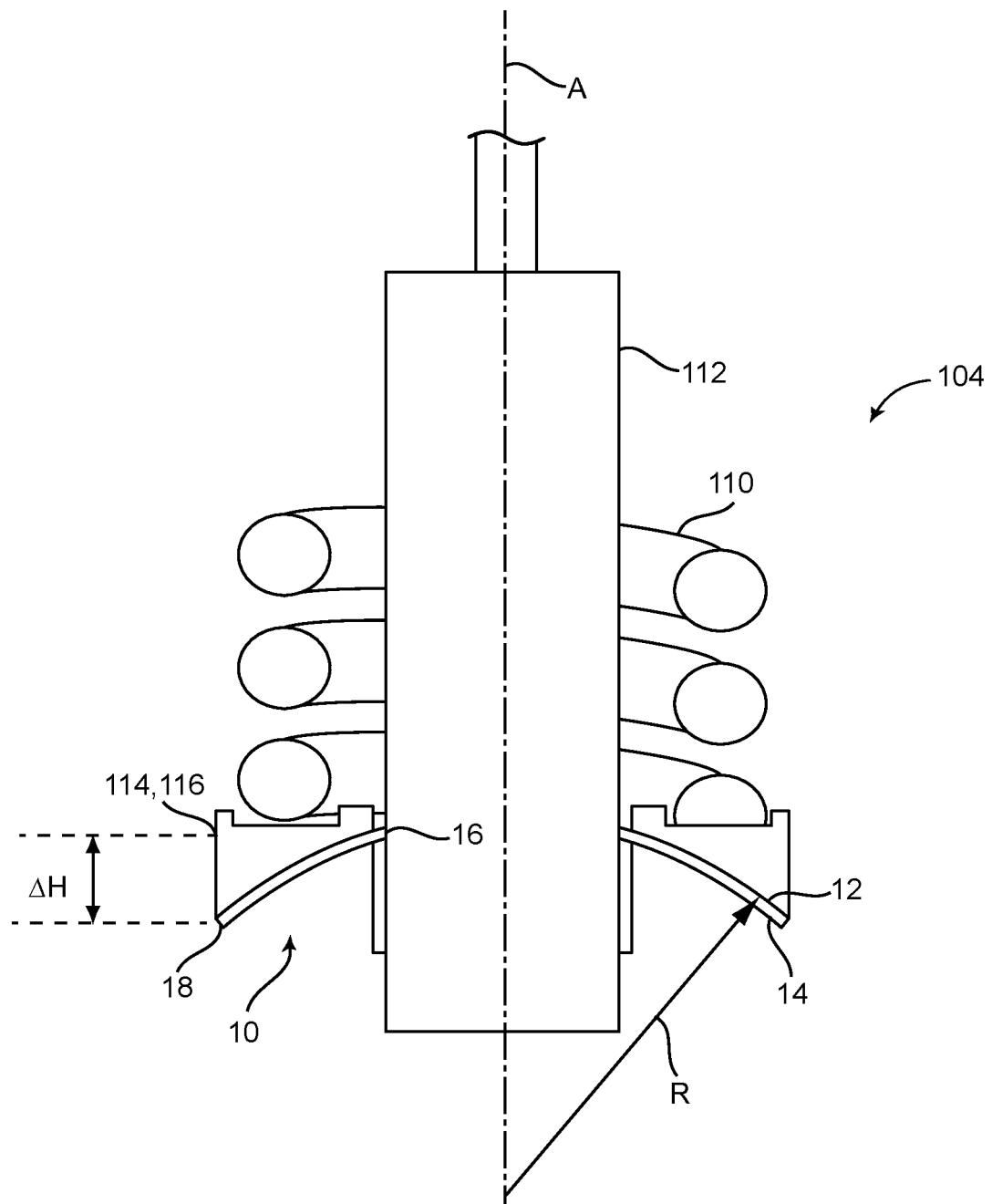
FIG. 2 is a partial cross-sectional view of a spring-damper assembly according to an embodiment of the invention.

Referring now specifically to FIG. 2, the spring-damper assembly 104 provided herein includes a lower spring seat 116 that is supported by a spherical support, shown generally at 10. The spherical support 10 is substantially annular in shape such that the spherical support 10 can be symmetrically disposed about and fixedly coupled to the housing of the damper 112, which is typically tubular in shape. Thus, the spherical support 10 is symmetrically disposed about the central, longitudinal axis, A, of the spring-damper assembly 104 and the damper 112. The spherical support 10 is formed with a radius, R, and includes an exterior surface 12 that supports the lower spring seat 116 and an interior surface 14. As can be appreciated, the magnitude of the radius, R, can be varied to adjust the amount of radial movement of the lower spring seat 116 relative to the central, longitudinal axis, A, of the spring-damper assembly 104 and the damper 112. As will be appreciated by those of ordinary skill in the art, all structural components of the spring-damper assembly 104 can be made of a steel allow, an aluminum alloy, etc. that provides sufficient structural integrity and rigidity.

As is illustrated, the exterior surface 12 of the spherical support 10 is generally concave towards the remainder of the housing of the damper 112, while the bottom of the lower spring seat 116 has a complementary convex shape, such that the lower spring seat 116 sits conformally on the exterior surface 12 of the spherical support 10. Preferably, the inner bore of the lower spring seat 116 has a diameter that is slightly larger than the diameter of the housing of the damper 112, such that the lower spring seat 116 is afforded a degree of translational movement with respect to the housing of the damper 112 along and across the spherical support 110. This translational movement of the lower spring seat 116 with respect to the housing of the damper 112 along and across the spherical support 110 provides a degree of movement of the coil spring 110 with respect to the damper 112, allowing the coil spring 110 to find a preferred, natural position with respect to the damper 112.

It will be appreciated that the spherical support 10 has a profile such that the spherical support 10 is highest in elevation proximate the damper 112 (i.e., at an innermost radial point 16), and is lowest in elevation distal the damper 112 (i.e., at an outermost radial point 18), as shown in FIG. 2. It will also be appreciated that the elevation of the spherical support 10 is continuously increasing from the outermost radial point 18 to the innermost radial point 16 by a distance, ΔH. The spherical support 10 enables the lower spring seat 116 (as illustrated) to move or translate relative to the exterior surface 12 of the spherical support 10 (i.e., in the radial direction) to reduce any side forces generated by the coil spring 110 on the damper 112. As a result, the spherical support 10 provides a self-aligning feature that provides an even pressure distribution exerted by the coil spring 110 on the lower spring seat 116, thereby substantially eliminating any bending torque on the damper 112 caused by the coil spring 110. Effectively, the coil spring 110 is permitted to find a naturally preferred alignment relative to the damper 112 that runs throughs the coil spring 110, eliminating these side forces and bending torque.

There is potentially a remaining offset of the spring center point when the coil spring 110 finds its natural position on the spherical support 10. This offset is dependent on the tolerances of the coil spring 110 and the diameter of the spherical support 10. The offset provides a small residual bending torque on the damper. Thus, the offset should be kept as small as possible by utilizing the smallest possible spherical support radius.

When used, the upper spherical support 10 is a mirror image of the lower spherical support 10. Thus, referring again to FIG. 2, the spring-damper assembly 104 includes an upper spring seat 114 that is supported by a spherical support 10. The spherical support 10 is substantially annular in shape such that the spherical support 10 can be symmetrically disposed about and fixedly coupled to the housing of the damper 112. Thus, the spherical support 10 is symmetrically disposed about the central, longitudinal axis, A, of the spring-damper assembly 104 and the damper 112. The spherical support 10 is formed with a radius, R, and includes an exterior surface 12 that supports the upper spring seat 114 and an interior surface 14. As can be appreciated, the magnitude of the radius, R, can be varied to adjust the amount of radial movement of the upper spring seat 114 relative to the central, longitudinal axis, A, of the spring-damper assembly 104 and the damper 112.

As is illustrated, the exterior surface 12 of the spherical support 10 is generally concave towards the remainder of the housing of the damper 112, while the top of the upper spring seat 114 has a complementary convex shape, such that the lower spring seat 116 sits conformally on the exterior surface 12 of the spherical support 10. Preferably, the inner bore of the upper spring seat 114 has a diameter that is slightly larger than the diameter of the housing of the damper 112, such that the upper spring seat 114 is afforded a degree of translational movement with respect to the housing of the damper 112 along and across the spherical support 110. This translational movement of the upper spring seat 114 with respect to the housing of the damper 112 along and across the spherical support 110 provides a degree of movement of the coil spring 110 with respect to the damper 112, allowing the coil spring 110 to find a preferred, natural position with respect to the damper 112.

Figure 3:
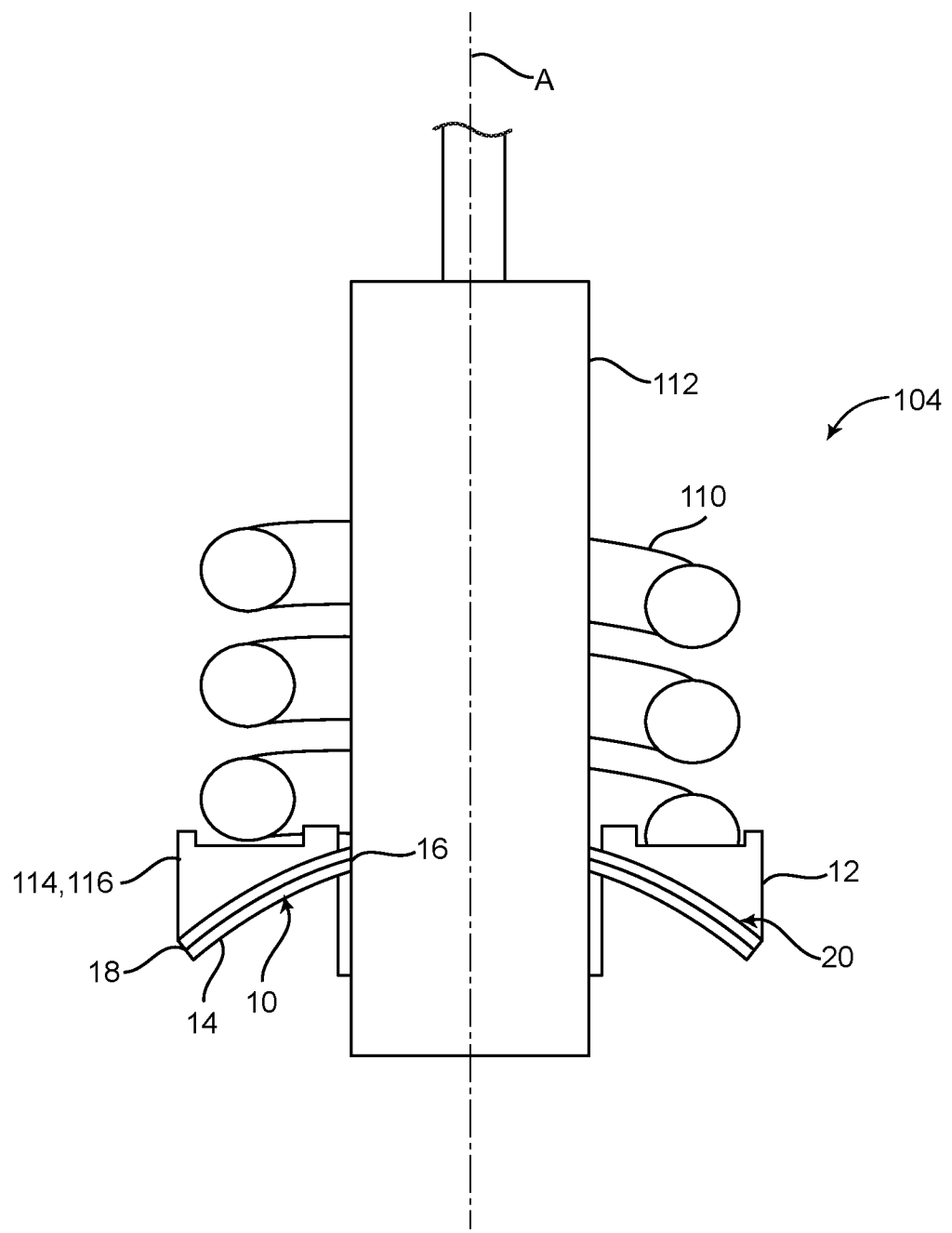
FIG. 3 is a partial cross-sectional view of a spring-damper assembly according to another embodiment of the invention.

Referring now specifically to FIG. 3, the spherical support 10 may also include a layer of material 20 disposed on the exterior surface 12 of the spherical support 10 for facilitating and potentially limiting the relative movement between the lower spring seat 116 and/or upper spring seat 114 and the spherical support(s) 10. In other words, the layer of material 20 is disposed between the spherical support(s) 10 and the lower spring seat 116 and/or upper spring seat 114. In one exemplary embodiment, the layer of material 20 includes an elastomeric material, such as rubber or the like, that is bonded to the exterior surface 12 and/or the lower spring seat 116 and/or upper spring seat 114. For example, the rubber can be vulcanized to the exterior surface 12 of the spherical support 10. This provides a translation layer that both enables and potentially limits movement within a predefined range of motion.

Again, it will be appreciated that the present invention is not limited by a single spherical support 10 for supporting only the lower spring seat 116, and that a second spherical support 10 can be provided to the upper spring seat 114. In this alternative embodiment, the self-aligning feature of the spherical support 10 causes the opposing spring seats 114, 116 to be preferentially centered about the central, longitudinal axis, A, of the spring-damper assembly 104, thereby cancelling almost all of the side forces exerted by the coil spring 110 on the concentrically disposed damper 112. Thus, the spring-damper assembly 104 includes spherical supports 10 that allow relative movement between the lower spring seat 116 and the upper spring seat 114 to reduce the effect of side forces that may be exerted by the coil spring 110 on the damper 112.

Thus, the problem of ride comfort deterioration and excessive damper wear from side forces exerted by the coil springs on the dampers in a suspension system, such as a double wishbone suspension system or the like, is solved by providing a spherical support engaging one or both of the lower and upper spring seats that provides a self-alignment feature for the coil spring with respect to the damper when coil spring side forces are acting on the damper that runs through the coil spring.

Although the double wishbone suspension described above is configured for the front left wheel of an automotive vehicle, it will be appreciated that the principles of the invention can be applied to the front right wheel and the left and right rear wheels (i.e., all corners) of the vehicle and may be used in conjunction with other types of suspensions.

Although the present invention is illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention, are contemplated thereby, and are intended to be covered by the following non-limiting claims for all purposes.

The invention claimed is:

1. A spring-damper assembly for use in a suspension system of a vehicle, the spring-damper assembly comprising:
   a damper;

a coil spring disposed axially about the damper and extending between a lower spring seat and an upper spring seat; and one or more spherical supports disposed about and coupled to the damper and movably engaging a complementary surface of one or more of the lower spring seat and the upper spring seat, wherein the one or more of the lower spring seat and the upper spring seat are symmetrically shaped about the damper, the one or more spherical supports minimizing side forces exerted by the coil spring on the damper by allowing relative movement between the coil spring and the damper perpendicular to an axis of the spring-damper assembly as the complementary surface of the one or more of the lower spring seat and the upper spring seat translates along the one or more spherical supports perpendicular to the axis of the spring-damper assembly;

wherein each of the one or more spherical supports comprises a convex surface with a peak disposed along an axis of the damper and directed towards the coil spring and the complementary surface of the one or more of the lower spring seat and the upper spring seat comprises a mating concave surface.

2. The spring-damper assembly of claim 1, further comprising a layer of material disposed between each of the one or more spherical supports and the respective one or more of the lower spring seat and the upper spring seat for facilitating relative movement therebetween.

3. The spring-damper assembly of claim 2, wherein the layer of material comprises an elastomeric material.

4. The spring-damper assembly of claim 2, wherein the layer of material is bonded to one or more of the spherical support and the associated spring seat.

5. The spring-damper assembly of claim 1, wherein a profile of each of the one or more spherical supports is such that the spherical support continuously increases in elevation from an outermost radial point distal the damper to an innermost radial point proximate the damper by a distance, ΔH.

6. The spring-damper assembly of claim 1, wherein each of the one or more spherical supports is symmetrically disposed about the damper.

7. The spring-damper assembly of claim 1, wherein each of the one or more spherical supports comprises an exterior surface and an interior surface both formed with a radius, R.

8. The spring-damper assembly of claim 1, wherein each of the one or more spherical supports comprises the convex surface with a radius R and the complementary surface of the one or more of the lower spring seat and the upper spring seat comprises the mating convex surface with a corresponding radius R.

9. A damper assembly for use in a suspension system of a vehicle, the damper assembly comprising:

a housing comprising a lower portion and an upper portion, wherein the lower portion and the upper portion of the housing are axially translatable with respect to one another; and one or more spherical supports disposed about and coupled to one or more of the lower portion and the upper portion, respectively, of the housing and adapted to movably engage a complementary surface of one or more of a lower spring seat and an upper spring seat, respectively, coupled to either end of a coil spring disposed therebetween, wherein the one or more of the lower spring seat and the upper spring seat are symmetrically shaped about the housing;

wherein the one or more spherical supports are adapted to minimize side forces exerted by the coil spring on the housing by allowing relative movement between the coil spring and the housing perpendicular to an axis of the damper assembly as the complementary surface of the one or more of the lower spring seat and the upper spring seat translates along the one or more spherical supports perpendicular to the axis of the damper assembly; and wherein each of the one or more spherical supports comprises a convex surface with a peak disposed along the axis of the damper assembly and directed towards the coil spring and the complementary surface of the one or more of the lower spring seat and the upper spring seat comprises a mating concave surface.

10. The damper assembly of claim 9, further comprising a layer of material coupled to each of the one or more spherical supports and adapted to contact the associated one or more of the lower spring seat and the upper spring seat for facilitating relative movement therebetween.

11. The damper assembly of claim 10, wherein the layer of material comprises an elastomeric material.

12. The damper assembly of claim 10, wherein the layer of material is bonded to the spherical support.

13. The damper assembly of claim 9, wherein a profile of each of the one or more spherical supports is such that the spherical support continuously increases in elevation from an outermost radial point distal the damper to an innermost radial point proximate the damper by a distance, ΔH.

14. The damper assembly of claim 9, wherein each of the one or more spherical supports is symmetrically disposed about the housing.

15. The damper assembly of claim 9, wherein each of the one or more spherical supports comprises an exterior surface and an interior surface both formed with a radius, R.

16. The damper assembly of claim 9, wherein each of the one or more spherical supports comprises the convex surface with a radius R and the complementary surface of the one or more of the lower spring seat and the upper spring seat comprises the mating concave surface with a corresponding radius R.

17. A vehicle suspension system, comprising:

a control arm; and a spring-damper assembly coupled to the control arm and adapted to be coupled to a structure of a vehicle, the spring-damper assembly comprising:

a damper;

a coil spring disposed axially about the damper and extending between a lower spring seat and an upper spring seat; and one or more spherical supports disposed about and coupled to the damper and movably engaging a complementary surface of one or more of the lower spring seat and the upper spring seat, wherein the one or more of the lower spring seat and the upper spring seat are symmetrically shaped about the damper, the one or more spherical supports minimizing side forces exerted by the coil spring on the damper by allowing relative movement between the coil spring and the damper perpendicular to an axis of the spring-damper assembly as the complementary surface of the one or more of the lower spring seat and the upper spring seat translates along the one or more spherical supports perpendicular to the axis of the spring-damper assembly;

wherein each of the one or more spherical supports comprises a convex surface with a peak disposed along an axis of the damper and directed towards the coil spring and the complementary surface of the one or more of the lower spring seat and the upper spring seat comprises a mating concave surface.

18. The vehicle suspension assembly of claim 17, wherein the one or more spherical supports each further comprise a layer of material disposed between each of the one or more spherical supports and the respective one or more of the lower spring seat and the upper spring seat for facilitating relative movement therebetween.

19. The vehicle suspension assembly of claim 18, wherein the layer of material comprises an elastomeric material.

20. The vehicle suspension assembly of claim 18, wherein the layer of material is bonded to one or more of the spherical support and the associated spring seat.

* * * * *